United States Patent
Urhahne

(10) Patent No.: US 9,150,200 B2
(45) Date of Patent: Oct. 6, 2015

(54) METHOD AND APPARATUS FOR CHANGING AN AUTONOMOUSLY TRAVELLING MOTOR VEHICLE TO A SAFE STATE

(71) Applicant: FORD GLOBAL TECHNOLOGIES, LLC, Dearborn, MI (US)

(72) Inventor: Joseph Andreas Urhahne, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/369,671

(22) PCT Filed: Apr. 22, 2013

(86) PCT No.: PCT/EP2013/058313
§ 371 (c)(1),
(2) Date: Jun. 27, 2014

(87) PCT Pub. No.: WO2013/160261
PCT Pub. Date: Oct. 31, 2013

(65) Prior Publication Data
US 2014/0365062 A1    Dec. 11, 2014

(30) Foreign Application Priority Data
Apr. 24, 2012   (DE) .................. 10 2012 206 725

(51) Int. Cl.
*B60W 50/16*    (2012.01)
*G08B 21/06*    (2006.01)
(Continued)

(52) U.S. Cl.
CPC ................. *B60T 7/12* (2013.01); *B60K 28/063* (2013.01); *B60K 28/066* (2013.01); *B60Q 1/52* (2013.01);
(Continued)

(58) Field of Classification Search
CPC ..... B60W 50/16; B60W 50/14; B60W 10/18; B60W 2050/143; B60W 2050/146; B60K 28/066; B60K 28/063; B60Q 1/52; G08B 21/06; G08B 21/0407; G08B 21/0415; G08G 1/166; B60T 7/12; B60T 7/14
USPC ............ 701/1, 23, 36, 70; 340/438, 439, 463, 340/468, 471
See application file for complete search history.

(56) References Cited

U.S. PATENT DOCUMENTS 5,340,202 A *   8/1994   Day ............................ 303/19
6,226,570 B1    5/2001   Hahn
(Continued)

FOREIGN PATENT DOCUMENTS

DE    102004041225 A1   3/2006
DE    102008031258 A1   1/2009
(Continued)

OTHER PUBLICATIONS

German Patent and Trademark Office, International Search Report for the corresponding International Application No. PCT/EP2013/058313 mailed Apr. 24, 2012, 4 pages.

*Primary Examiner* — Russell Frejd
(74) *Attorney, Agent, or Firm* — Frank A. MacKenzie; Brooks Kushman P.C.

(57) ABSTRACT

A method and an apparatus for changing a motor vehicle in an autonomous travel mode to a safe state when the driver of the motor vehicle is not able to monitor the autonomous travel mode and to assume control of the motor vehicle. The vehicle driver is warned using warning signals of increasing intensity; other road users in the area surrounding the motor vehicle are warned using optical and/or acoustic signals; the motor vehicle is braked and/or accelerated repeatedly such that parts of the body of the vehicle driver noticeably move in the direction of travel owing to inertia (the braking and/or acceleration being so brief that the travel speed of the motor vehicle changes relatively little); and the motor vehicle is brought to a standstill or is kept at a standstill by automatic braking in order to change the vehicle to a safe state.

12 Claims, 1 Drawing Sheet

(51) Int. Cl.

| | | |
|---|---|---|
| *G08B 21/04* | (2006.01) | |
| *B60K 28/06* | (2006.01) | |
| *B60Q 1/52* | (2006.01) | |
| *B60T 7/12* | (2006.01) | |
| *B60T 7/14* | (2006.01) | |
| *G08G 1/16* | (2006.01) | |
| *B60W 50/14* | (2012.01) | |
| *B60W 10/18* | (2012.01) | |

(52) U.S. Cl.
CPC  *B60T 7/14* (2013.01); *B60W 50/14* (2013.01); *B60W 50/16* (2013.01); *G08B 21/0415* (2013.01); *G08B 21/06* (2013.01); *G08G 1/166* (2013.01); *B60W 10/18* (2013.01); *B60W 2050/143* (2013.01); *B60W 2050/146* (2013.01); *G08B 21/0407* (2013.01)

(56) References Cited

U.S. PATENT DOCUMENTS

| | | | | |
|---|---|---|---|---|
| 7,797,107 | B2 * | 9/2010 | Shiller | 701/301 |
| 7,891,457 | B2 * | 2/2011 | Holland et al. | 180/273 |
| 2004/0262063 | A1 * | 12/2004 | Kaufmann et al. | 180/169 |
| 2010/0045451 | A1 * | 2/2010 | Periwal | 340/439 |
| 2010/0045452 | A1 * | 2/2010 | Periwal | 340/439 |
| 2011/0241862 | A1 * | 10/2011 | Debouk et al. | 340/439 |
| 2011/0309920 | A1 * | 12/2011 | Brooks | 340/407.2 |

FOREIGN PATENT DOCUMENTS

| | | |
|---|---|---|
| DE | 102008019346 A1 | 9/2009 |
| DE | 102008018474 A1 | 11/2009 |
| DE | 102010031038 A1 | 1/2012 |

* cited by examiner

METHOD AND APPARATUS FOR CHANGING AN AUTONOMOUSLY TRAVELLING MOTOR VEHICLE TO A SAFE STATE

CROSS-REFERENCE TO RELATED APPLICATION

This application is the U.S. national phase of PCT Application No. PCT/EP2013/058313 filed on 22 Apr. 2013, which claims priority to DE Patent Application No. 10 2012 206 725.6 filed on 24 Apr. 2012, the disclosures of which are incorporated in their entirety by reference herein.

TECHNICAL FIELD

The invention relates to a method and a device for placing a motor vehicle which is in an autonomous driving mode in a safe state if the driver of the motor vehicle is not capable of monitoring the autonomous driving mode and, under certain circumstances, assuming control of the motor vehicle.

BACKGROUND

DE 20 2008 019 346 A1 teaches a method, which is carried out during the automatic parking of a motor vehicle, or removal of a motor vehicle from a parking space. As soon as an actuating device or dead man's switch, which, for example, the accelerator pedal can function as, is no longer in a predetermined position, the motor vehicle is braked, under certain circumstances with a defined maximum deceleration, and an electronic parking brake is activated. The operator can also be outside the motor vehicle during the parking process or process of removing the motor vehicle from a parking space and can in this case activate a visual or acoustic warning device for other road users by remote control.

SUMMARY

The present invention is directed at situations in which the motor vehicle usually drives on a road under autonomous control in order to convey someone from one location to another, or in situations when it is currently not possible to drive in such a way, when it is stationary on the road such as for example in a traffic jam.

A warning escalation strategy is started when the vehicle driver fails to activate a dead man's switch. A dedicated switch or the movement of the steering wheel and/or of the accelerator pedals can function as a dead man's switch. Such a dead man's switch, referred to in this way due to its railroad origins, forms part of the man/machine interface in partially or completely autonomously driving road motor vehicles and serves to prove that the vehicle driver is still on board and alive, healthy, awake and capable of monitoring the driving situation of the motor vehicle with his entire awareness and of intervening if necessary by assuming control of the motor vehicle again. In order to prove this, the vehicle driver is requested at regular or randomly selected intervals to activate the dead man's switch or some device which functions as a dead man's switch.

The invention is based on the object of proposing a warning escalation strategy which is particularly suitable for motor vehicles which usually drive autonomously on a road or are temporarily stationary on a road. This strategy is also to allow for different causes of a failure of the dead man's switch to be activated, for example in the event of the vehicle driver having briefly fallen asleep, as well as for the worst case in that the vehicle driver suffers a heart attack or a stroke.

The warning escalation strategy disclosed herein, at the end of which the motor vehicle is placed in a safe state if necessary, can reliably wake up a vehicle driver who has fallen asleep, while the motor vehicle is driving autonomously. Furthermore, the strategy copes well with situations in which the vehicle driver has a serious health problem and consequently is no longer capable of controlling the motor vehicle. By virtue of the additional warning of other road users, harm can be prevented not only to them but also to a vehicle driver with health problems since the other road users become aware that said driver urgently requires help.

The warning escalation strategy disclosed herein comprises a series of successive steps which can also be carried out in an overlapping fashion, wherein the vehicle driver is firstly warned by means of warning signals with increasing intensity, for example visually and/or acoustically or else haptically by means of slight vibrations in the steering wheel and/or seat. Subsequently or starting from a certain driver warning intensity, other road users are also warned, preferably by means of a type of flashing warning light whose frequency and/or light sources differ from those of the customary breakdown flashing warning light. Shortly after this or at the same time, intensive haptic warnings are generated for the vehicle driver, in that he is jolted by brief abrupt braking processes. The motor vehicle is only placed in a safe state by automatic braking if the driver does not react to any of these measures.

The method steps disclosed herein, in particular that of intensively haptically warning the vehicle driver, may be carried out as a function of whether the motor vehicle is currently traveling or is stationary. If the motor vehicle is currently traveling, in order to perform intensive haptic warning, the motor vehicle is repeatedly briefly and abruptly braked, specifically in each case with an intensity such that the upper body of the vehicle driver moves a short distance away from the backrest toward the steering wheel and also so briefly that the current velocity of the motor vehicle is changed relatively little as a result. If the motor vehicle is currently stationary, the same effect can be achieved by repeatedly briefly making the motor vehicle move forward and then abruptly braking it again. For the sake of safety, this is, however, carried out only if it is detected by means of a sensor system that a predetermined minimum distance in front of the motor vehicle is free of obstacles.

The intensive haptic warning is ended when a predefined maximum number of repetitions is reached or when a predetermined forward distance is traveled or if an obstacle which appears in front of the motor vehicle is detected. At this moment, the motor vehicle is braked with moderate deceleration to a stationary state, preferably with approximately 0.5 m/s$^2$ if it was previously still traveling, and is subsequently or otherwise kept in a stationary state for as long as the technical conditions in the motor vehicle permit, for example for as long as the electrical energy stored in a vehicle battery is sufficient to keep the main brake system activated. If the motor vehicle has a parking brake which can be activated electrically, it can, of course, also be activated.

In each of these phases the method is ended if it is detected that the vehicle driver is clearly capable again of monitoring the autonomous driving mode and of assuming control of the motor vehicle, because he has activated the dead man's switch in the meantime.

Exemplary embodiments will now be described with reference to the drawing, in which:

DETAILED DESCRIPTION

Figure 1:
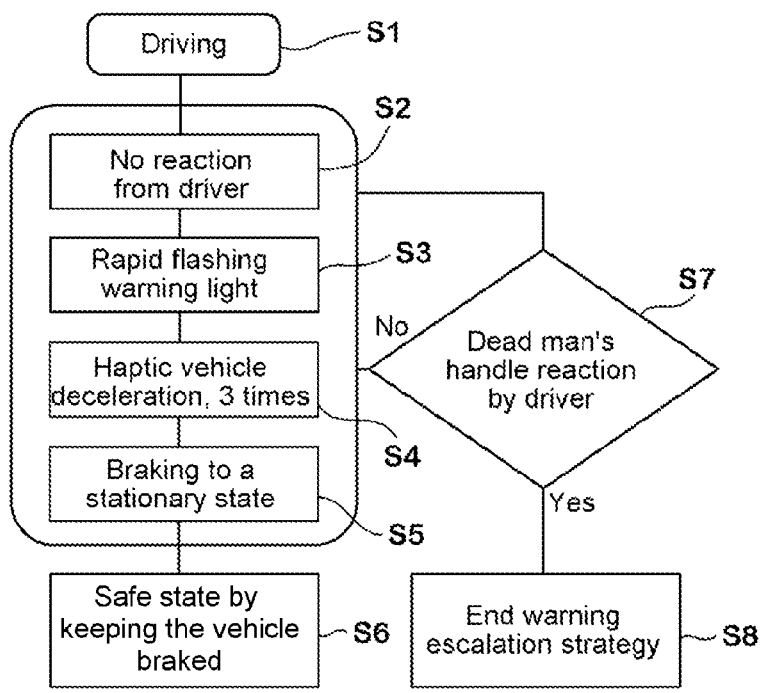
FIG. 1 shows a flowchart of a warning escalation strategy in a motor vehicle driving in the autonomous driving mode.
Figure 2:
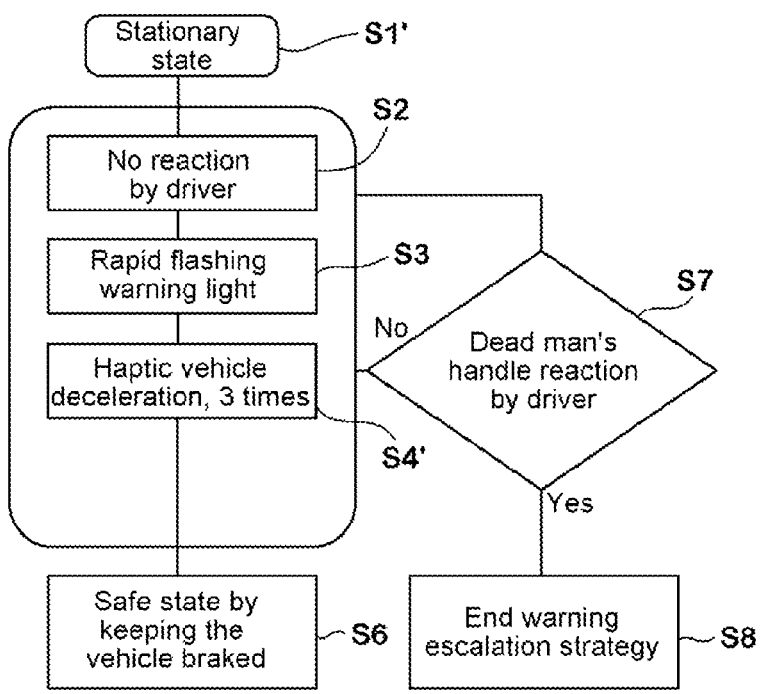
FIG. 2 shows a flowchart of a warning escalation strategy in a motor vehicle which is stationary in the autonomous driving mode.

Two situations are differentiated in which in the autonomous driving mode of a motor vehicle: 1) a requested dead man's switch reaction of the responsible vehicle driver fails to occur, specifically during driving, as shown in FIG. 1, and 2) during a stationary state of the motor vehicle, as shown in FIG. 2. In both cases, a warning escalation strategy is started and is ended as soon as the vehicle driver activates the dead man's switch.

If, as shown in FIG. 1, it is detected in step S1 during the autonomous driving that a request to activate the dead man's switch has not been rescinded after a time interval, distance interval or other interval $I_a$, in step S2 repeated warning of the vehicle driver occurs with visual and/or acoustic and/or relatively weak haptic signals with increasing intensity. If there is no reaction thereto either, it is assumed in step S2 that the vehicle driver is no longer capable of monitoring the autonomous driving mode and, under certain circumstances, assuming control of the motor vehicle.

In this case, in step S3 other road users in the vicinity of the motor vehicle are warned by causing the flashing warning lights of the motor vehicle to flash with a frequency which is significantly higher than that of the customary breakdown flashing warning light (for example 2 Hz). Alternatively or additionally, other motor vehicle lights can also be caused to flash or the flashing lights can have different colors than usual.

Subsequently, in step S4 a series of intensive haptic warnings are generated for the vehicle driver by repeatedly and briefly quite suddenly increasing the brake pressure in the main brake system of the motor vehicle, to be precise so abruptly and intensively that each time the upper body of the vehicle driver moves a short distance away from the backrest toward the steering wheel due to inertia. However, the current velocity of the motor vehicle should not change unusually as a result of this.

If the intensive haptic warnings have been generated three times in step S4 and the vehicle driver has still not yet reacted, in step S5 a brake pressure is generated which brakes the motor vehicle with moderate deceleration, for example 0.5 m/s², to a stationary state. The flashing warning lights continue to flash here until in step S6 the motor vehicle is in a stationary state. The motor vehicle is kept braked in the stationary state for as long as the energy stored in the motor vehicle is sufficient to activate the main brake system.

In step S7 it is continuously checked whether the vehicle driver has activated the dead man's switch in one of the steps S2 to S5, for example by means of steering movements or pedal movements. If this is the case, in step S8 the warning escalation strategy is ended and the system returns to step S1. If this is not the case, the system continues with the corresponding step S2, S3, S4 or S5.

On the other hand, if, as shown in FIG. 2, it is detected in step S1' during a vehicle stationary state in the autonomous driving mode that a request to activate the dead man's switch has not been rescinded after a time interval $T_a$, in step S2 repeated warning of the vehicle driver occurs with visual and/or acoustic and/or relatively weak haptic signals with increasing intensity. If there is no reaction thereto either, it is assumed that the vehicle driver is no longer capable of monitoring the autonomous driving mode and, under certain circumstances, assuming control of the motor vehicle.

In this case, in step S3 other road users in the vicinity of the motor vehicle are warned by causing the flashing warning lights to flash with a frequency which is significantly higher than that of the customary breakdown flashing warning lights (for example 2 Hz).

Subsequently, in step S4' it is checked whether a safety distance in front of the motor vehicle is free of obstacles. If this is the case, the motor vehicle is accelerated to a very low speed and then, as in step S4 in FIG. 4, braked again by an abrupt braking pulse. This procedure is carried out repeatedly provided no obstacle appears in front of the motor vehicle.

If in step S4' the intensive haptic warnings have been generated three times or the safety distance is used up or an obstacle has appeared in front of the motor vehicle and the vehicle driver has not yet reacted, in step S6 the motor vehicle is kept braked in the stationary state for as long as the energy stored in the motor vehicle is sufficient to activate the main brake system.

In step S7 it is continuously checked whether the vehicle driver has activated the dead man's switch, for example by means of steering movements or pedal movements, in one of the steps S2 to S4'. If this is the case, in step S8 the warning escalation strategy is ended and the system returns to step S1'. If this is not the case, the system continues with the corresponding step S2, S3 or S4'.

The invention claimed is:

1. A method for placing a motor vehicle operating in an autonomous driving mode in a safe state if a driver of the motor vehicle is not capable of monitoring the autonomous driving mode,
wherein if it is detected that the driver is not capable of monitoring the autonomous driving mode, the following steps are carried out automatically in sequence:
   a) warning the vehicle driver using warning signals that increase in intensity with time;
   b) warning other road users in a vicinity of the motor vehicle using visual and/or acoustic signals;
   c) braking and/or accelerating the motor vehicle repeatedly with an intensity such that parts of a body of the vehicle driver move perceptively due to inertia, and furthermore so briefly that a current velocity of the motor vehicle changes relatively little; and
   d) bringing the motor vehicle to a stationary state by automatic braking and/or keeping the vehicle in the stationary state.

2. The method of claim 1, wherein the step of warning other road users comprises activating a warning light whose appearance differs from that of a customary breakdown warning light.

3. The method of claim 1, wherein at least one of steps c) and d) is carried out as a function of whether the motor vehicle is currently traveling or is stationary.

4. The method of claim 3, wherein if the motor vehicle is traveling, the motor vehicle is repeatedly briefly and abruptly braked in step c), specifically in each case with an intensity such that an upper body of the driver moves a short distance away from a backrest toward a steering wheel.

5. The method of claim 3, wherein if the motor vehicle is stationary and it is detected by means of a sensor system that a predetermined minimum distance in front of the motor vehicle is free of obstacles, the motor vehicle is repeatedly briefly made to move forward and then abruptly braked again in step c).

6. The method of claim 5, wherein the repeated abrupt braking and forward movement are ended when a predefined maximum number of repetitions is reached or when a predetermined forward distance is traveled or if an obstacle is detected in front of the motor vehicle.

7. The method of claim 1, wherein in step d) the motor vehicle is braked with a deceleration of approximately 0.5 m/s².

8. The method of claim 1, wherein the method is ended if it is detected that the driver has taken an action indicating that the driver is capable again of monitoring the autonomous driving mode and of assuming control of the motor vehicle.

9. A method for a vehicle operating in an autonomous driving mode comprising:
- detecting that a vehicle driver has failed to activate a device acting as a dead man's switch;
- generating warning signals increasing in intensity over time to alert the driver;
- activating a visual signal to warn other road users in a vicinity of the vehicle; and
- braking and/or accelerating the vehicle repeatedly with an intensity selected to cause the driver to perceive inertial movement.

10. The method of claim 9, further comprising, after the braking and/or accelerating step:
- applying automatic braking to bring the motor vehicle to a stationary state and/or to keep the motor vehicle in a stationary state.

11. The method of claim 9, wherein the intensity and a duration of the braking and/or accelerating are selected to produce a negligible change in a current velocity of the motor vehicle.

12. The method of claim 9, wherein the device acting as a dead man's switch comprises at least one of a vehicle steering wheel and a vehicle control pedal.

\* \* \* \* \*